LENS IRIS ADJUSTMENT MEANS FOR A CAMERA OR THE LIKE
Filed Nov. 9, 1954 3 Sheets-Sheet 1
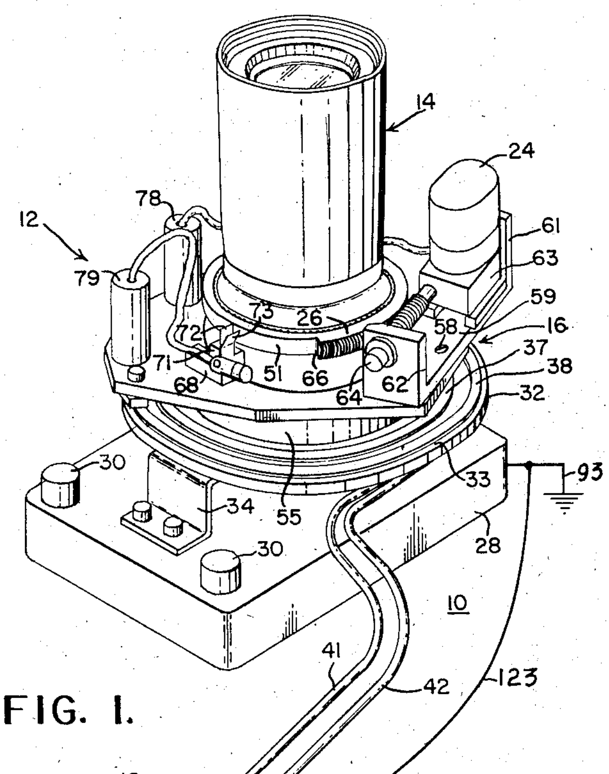
FIG. 1.
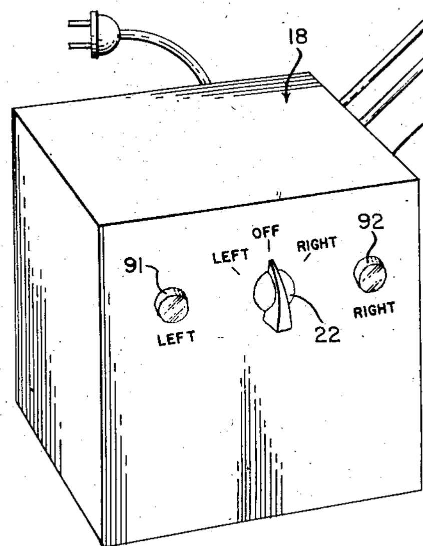
FIG. 2.
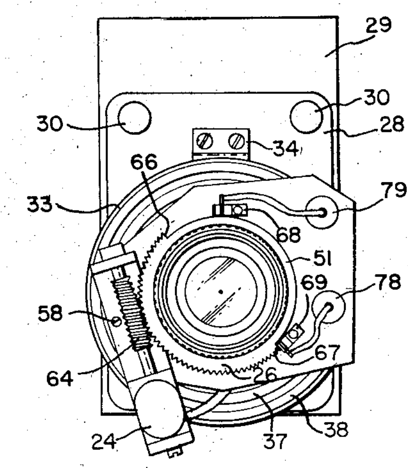
*INVENTOR.*
JAMES H. FIELD
BY George Sipkin
B. L. Zangwill
ATTORNEYS June 16, 1959 J. H. FIELD 2,890,641
LENS IRIS ADJUSTMENT MEANS FOR A CAMERA OR THE LIKE
Filed Nov. 9, 1954 3 Sheets-Sheet 2
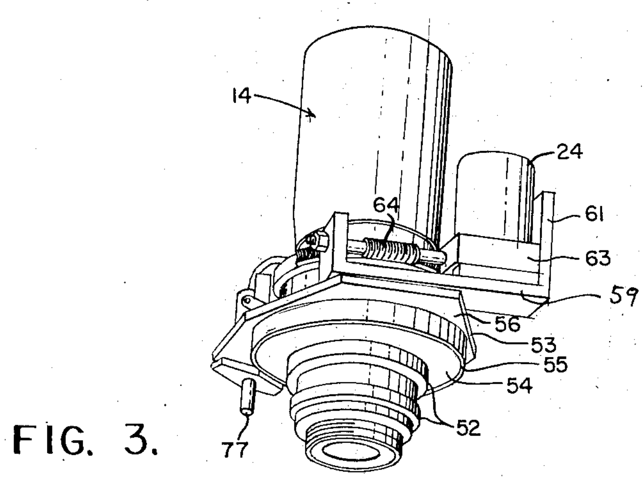
FIG. 3.
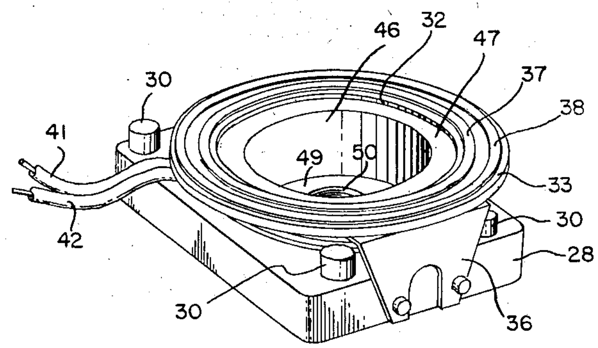
*INVENTOR.*
JAMES H. FIELD
BY George Sipkin
B. L. Zangwill
ATTORNEYS

LENS IRIS ADJUSTMENT MEANS FOR A CAMERA OR THE LIKE

Filed Nov. 9, 1954 3 Sheets-Sheet 3

INVENTOR.
JAMES H. FIELD
BY George Sipkin
B. L. Zangwill
ATTORNEYS

United States Patent Office 2,890,641

Patented June 16, 1959

2,890,641

LENS IRIS ADJUSTMENT MEANS FOR A CAMERA OR THE LIKE

James H. Field, Bethesda, Md., assignor to the United States of America as represented by the Secretary of the Navy Application November 9, 1954, Serial No. 467,904

1 Claim. (Cl. 95—64)

(Granted under title 35, U.S. Code (1952), sec. 266)

The invention described herein may be manufactured and used by or for the Government of the United States of America for governmental purposes without the payment of any royalties thereon or therefor.

The present invention relates to a camera lens system and more particularly to an apparatus and circuit for remotely adjusting and controlling the lens iris in a camera lens or the like.

With the advent of television cameras and other photographic apparatus which are normally inaccessible or inconveniently positioned during operation thereof, it has become desirable to remotely control or adjust the lens and, particularly, the lens iris in such units. Additionally, because of the circumstances usually surrounding the operation of such apparatus, especially a television camera, it is extremely desirable that the lens iris be adjustable quickly and accurately whenever necessary, and, further, be simultaneously adjustable with the focus adjustment of the camera lens.

Various devices are found in the prior art for remotely adjusting the lens iris of a camera. These devices usually comprise solenoid-drive arrangements which control the lens iris by a stepping operation. However, because of the inherent nature of solenoid-drives and the structural configuration of their overall mechanism, serious difficulty was encountered in their use. Besides being relatively bulky for the associated apparatus, the mechanism was slow in operation and generally unreliable because of the lack of a positive drive system. Moreover, it was difficult if not impossible to adjust the iris at the same time that the focus adjustment of the lens was operated, and, further, no provision for an automatic limit control of the iris movement was made. As a result of the latter, the lens was frequently jammed or conversely, unscrewed within its mount.

In accordance with the teachings of the present invention, a novel lens iris adjustment system is provided to obviate the difficulties heretofore encountered. The system comprises a lens unit including an integral lens assembly and a lens iris drive unit, and a remotely positioned motor control circuit for controlling the movements of the lens iris drive unit. Through a simple and novel arrangement, the adjustment system functions to remotely control the lens iris in a quick and accurate manner. Moreover, due to an incorporated limit arrangement, the system operates to automatically stop all motion whenever the iris control drive linkage and hence, the lens iris, has progressed to either of its extreme limits of travel.

Accordingly, one object of the present invention is to provide a lens iris adjustment system for adjusting and controlling the lens iris in a lens system from a remote position.

Another object of the invention is to provide a simple and compact arrangement for remotely adjusting the lens iris of the camera or the like in a quick and accurate manner.

A further object of the invention is the provision of a lens iris adjustment system having an integral lens assembly and lens iris drive unit.

Still another object of the invention is the provision of a lens iris adjustment system having means for preventing over travel of the lens iris drive linkage and means for providing an indication whenever the lens iris has been moved to either of its extreme limits of travel.

Other objects and many of the attendant advantages of this invention will be readily appreciated as the same becomes better understood by reference to the following detailed description when considered in connection with the accompanying drawings wherein:

Fig. 1 is a perspective view of a complete lens iris adjustment system constructed in accordance with the teachings of the present invention;

Fig. 2 is a plan view of the lens unit shown in Fig. 1;

Fig. 3 is a partially-exploded perspective view of the lens unit shown in Fig. 1.

Figure 4:
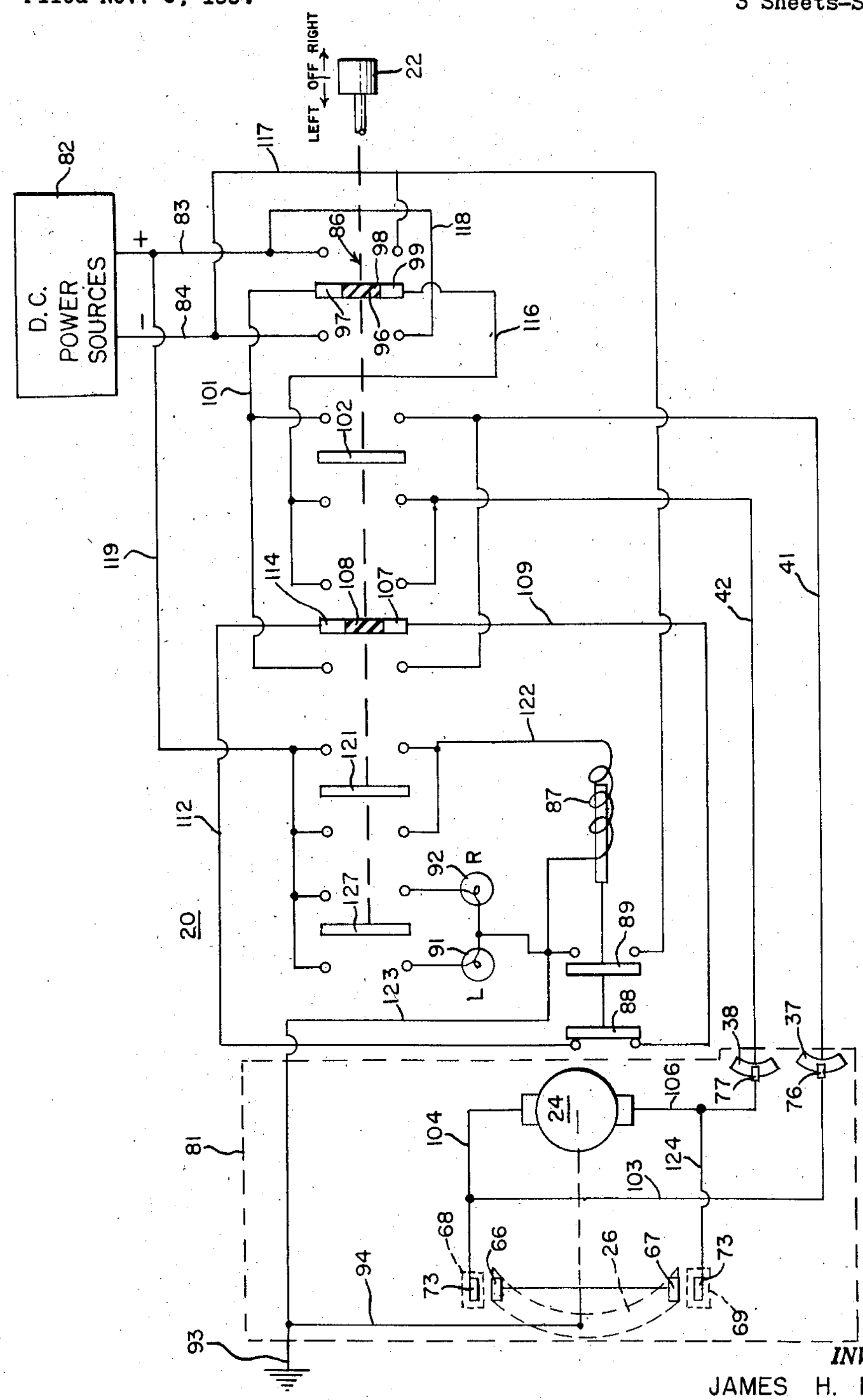
Fig. 4 is a complete schematic diagram of an electrical control circuit constructed in accordance with the invention and comprising a preferred embodiment of the electrical system of the lens iris adjustment system.

Referring now to the drawings wherein like reference characters designate like or corresponding parts throughout the several views, there is shown in Fig. 1 a perspective view of a complete lens iris adjustment system 10 comprising a lens unit 12 having a lens assembly 14 and a lens iris drive unit 16, and a lens iris control box 18 containing the electrical motor control circuit 20. As will hereinafter more fully appear, lens unit 12 is adapted to be mounted upon the front plate of a camera 29 (Fig. 2) or the like and serves as the lens for the camera. Whenever the camera is placed in operation and it is desired that the lens iris of the lens unit be adjusted, a control knob 22 mounted on control box 18 is manipulated in an appropriate direction. Movement of the control knob 22 acts to selectively energize a motor control circuit 20 contained in box 18 for energizing a reversible D.C. motor 24 of the lens iris drive unit 16. Depending upon the length of time knob 22 is held in drive position and the direction of knob movement, motor 24 will rotatably drive the iris control gear 26 and, hence, the lens iris in lens assembly 14.

Referring specifically to the drawings and in particular to Figs. 1, 2, and 3, the lens unit 12 includes an attachment or mounting base 28 for supporting the apparatus upon the face 29 (Fig. 2) of a camera or the like. Base 28 preferably is formed rectangular in shape and is provided adjacent each corner thereof with a threaded bore (not shown) for receiving a threaded securing bolt 30. The bolts serve to releasably secure lens unit 10 to the camera face. It will be apparent that while the mounting base is disclosed as being rectangular in shape, the configuration and size of this member may be varied in accordance with the exigencies of the particular application.

A large bore (not shown) is formed centrally of mounting base 28 for receiving an annular support 32 having an integral, outwardly extended, annular flange 33 along its upper edge portion (as viewed in Fig. 3). Support 32 is preferably formed of an electrical insulating material and is rigidly secured to mounting base 28 by a suitable pair of oppositely disposed brackets 34 and 36. Molded or otherwise secured upon the upper surface of flange 33 is a pair of concentric slip rings 37 and 38, each of which are electrically connected to leads 41 and 42, respectively, in any known manner. Desirably, the slip rings are formed of a good electrically conductive material such as copper and are provided with a smooth upper bearing surface which protrudes slightly above the upper surface of flange 33.

Fitted within the bore of annular insulating support 32 and threaded within base 28 is a metallic, cup-shaped focus retaining member 46. Desirably, the member is provided with an outwardly extended, annular dust flange 47 along its upper edge which slidably fits within the inner rim of flange 33. The arrangement is such that retaining member 46 serves as a removable support for portions of the lens unit 12 as hereinafter described, and further, as a longitudinally adjustable focus support for the lens assembly 14. The bottom wall 49 of cup-shaped retainer member 46 is provided with a threaded hole 50 which serves to removably retain the lens assembly 14 and portions of the lens iris drive unit 16 in position. It should be noted here that mounting or attachment base 28, annular insulating plate 32, and retaining member 46 may be permanently secured to the front panel of the camera and that lens assembly 14 may be substituted or replaced as desired by simply unscrewing its threaded attachment in the threaded bore 50.

The lens assembly 14, which carries a portion of the lens iris drive unit 16 thereon, is of conventional construction and includes the usual lens arrangements, focus, adjustment means, etc. Inasmuch as these arrangements form no part of the invention per se, the details thereof will not be described herein. However, it will be noted that the lens assembly is modified to the extent that the usual iris adjustment ring is replaced by or has fixed thereon, a circular ring 51 having an integral segmental iris control gear 26.

As best shown in Fig. 3, the lower portion of lens assembly 14 is threaded and is adapted to be received in the threaded bore 50 of retaining member 46. Mounted on this lower portion as by the conventional lens assembly retaining rings 52, is an integral drive unit support platform 53. The platform is provided with an annular insulating central body 54 which is adapted to fit snugly around the lens assembly 14 and, when in assembled relation with retaining member 46, bears upon the flange 47. Surrounding the periphery of body 54 is an annular, metallic contact sleeve 55 having an irregularly shaped, outwardly extended bearing flange or shelf 56 integrally formed therewith along its upper rim. It will be apparent that the upper surface of flange 56 defines the shelf of support platform 53.

The support platform 53 functions to carry the drive components for the lens iris and the associated electrical portions of these components. Positioned on one side of the flange or shelf 56 and adjustably mounted thereon as by a bolt 58 is a drive frame 59 having a pair of oppositely disposed, vertical standards 61 and 62. Interposed between the standards and positioned adjacent standard 61 is the reversible, direct current drive motor 24. The motor, which is operatively connected to and supported on a suitable gear reduction mechanism or gear box 63, is preferably of conventional construction. The output of gear reduction mechanism 63 is connected to and supports one end of a worm gear 64. The other end of worm gear 64 is journalled in standard 62.

Meshing with worm gear 64 is the iris control or sector gear 26 which is formed upon circular ring 51. For reasons which will soon become apparent, the sector gear 26 is desirably raised relative to the main body of ring 51, so as to provide an abutment 66 and 67, respectively, between the ends of the sector gear teeth and the main body. Secured to shelf 56 and disposed on opposite sides of lens assembly 14, in the path of sector gear 26, is a pair of limit blocks 68 and 69. These blocks, which are formed of electrical insulating material, are provided with a raised reinforcement portion 71 against which are secured a rigid leaf or stop member 72 and a flexible leaf or stop member 73. The stop members are mounted in a manner that they engage abutment 66 or 67 whenever the sector gear has traversed to its full limit of travel in one direction. The stop members 72 and 73 on blocks 68 and 69 are each connected through a suitable electrical lead to electrical brushes 76 and 77 (Fig. 4) carried in respective brush holders 78 and 79. The latter are fixedly mounted and aligned on shelf 56 relative to slip rings 37 and 38, respectively, and cover an insulated bore which permits access of the brushes to the slip rings.

From the description set forth thus far, it will be apparent that upon energization of motor 24, worm gear 64 will be driven through gear reduction mechanism 63 to drive iris control or sector gear 26. Since this gear is in direct drive relation with the lens iris, rotation of this gear will adjust the iris opening in the lens assembly 14. As the iris control gear is rotated to approximately its full limit of travel, whether towards the left or right direction, an abutment, 66 or 67, engages a flexible stop 73. This completes an electrical circuit from the grounded camera mounting base 28 through the metallic retaining member 46, iris control or sector gear 26, flexible stop 73, an electrical lead to its associated electrical brush, the slip ring in contact with the electrical brush, and to the motor control circuit 20, as will hereinafter more fully be described, to immediately deenergize motor 24 and stop rotation of the lens iris. In the event that motor 24 continues to rotate after deenergization due to its momentum, rigid stop 72 serves to reinforce stop 73 to completely stop motor 24 and, hence, the lens iris. As such, movement of the lens iris beyond its full limit of travel is prevented and thus, jamming or, conversely, unscrewing of the lens assembly from its mount 46 is prevented.

The complete electrical circuit of the lens iris adjustment system is shown in schematic form in Fig. 4. For purposes of clarity, the portion of the electrical circuit which is carried by or is included in the lens iris drive unit 16 is shown enclosed within the dotted line area indicated at 81. The motor control circuit proper is mounted within the lens control box 18 and comprises a direct current power source 82 of any suitable or conventional type. The output of power source 82 is taken across electrical leads 83 and 84 which, for purposes of convenience in explanation, are designated as positive and negative respectively. Also included in the circuit is a reversing switch 86 which is operated through the medium of control knob 22. It is noted that in the schematic diagram, reversing switch 86 is illustrated as being controlled by manipulating control knob 22 inwardly or outwardly from a neutral position. This, however, is contrary to the designation of control knob 22 on control box 18 since the knob is illustrated there as a right-left rotatable switch. The inward-outward arrangement as shown in Fig. 4 is for convenience only; it being obvious that the circuit arrangement can be easily converted to a left-right, rotatable switching arrangement by one skilled in the art. The circuit further includes an unlatch relay 87 having a pair of bridging contactors 88 and 89, a left and a right indicator light 91 and 92, respectively, and the electro-mechanical arrangement of the lens iris drive unit 16. The latter comprises the reversible direct current motor 24, grounding iris control gear 26, stops 73 of limit blocks 68 and 69, brushes 76 and 77, and slip rings 37 and 38. A ground connection is indicated at 93 and is shown as being connected to the iris control gear 26 by lead 94. The ground connection in the lens iris system 10 is taken as the camera body and lead 94 comprise the metallic retainer 46, lens assembly 14, and the iris control gear 26. Line 123 connects ground 93 to circuit 20 in box 18 (see Figs. 1 and 4).

In order to facilitate the description of the specific circuits and the coaction between the various components comprising the system, the circuit and associated components are described below in terms of system operation. Moreover, for clarity, the operation given below is broken into individual operations which are performed by the system.

*Right movement of the lens iris*

Referring specifically to Fig. 4, movement of the lens iris is initiated and controlled by manipulating control knob 22 and which, for right operation, is pulled outwardly or towards the right in Fig. 4. This movement of control knob 22 serves to position the contactors of reversing switch 86 in proper engagement with their associated contacts for proper energization of the circuit. Upon movement of control knob 22 to its right position, motor 24 is energized for rotation in a counter-clockwise direction by the following circuit: power is taken from D.C. power source 82 through positive or B+ lead 83 and fed to a reversing contactor 96 comprising an insulated center portion 98 and upper and lower closing contacts 97 and 99, respectively. The B+ power passes from upper closing contact 97, through line 101, bridging contactor 102, line 41, slip ring 37 of the annular insulating plate 32, electrical brush 76, lead 103, and lead 104 to one side of the armature of reversable D.C. motor 24.

The negative potential of D.C. power source 82 is connected to the other armature terminal of motor 24 by line 106, and is fed back to the power source through brush 77, slip ring 38, line 42, lower contactor 107 of a circuit closing contactor 108, line 109, first bridging relay contactor 88, line 112, upper contactor 114 of circuit closing contactor 108, line 116, and through lower closing contact 99 to the line 117 connected to the negative terminal of power supply 82. It will be apparent therefore that upon movement of the control knob 22 to its right position, the motor 24 will be connected across D.C. power source 82 in a manner so as to cause counter-clockwise rotation of the lens iris.

*Left movement of the lens iris*

In the event it is desired that the lens iris be moved in its clockwise or left direction, as viewed in Fig. 1, control knob 22 is moved inwardly towards the indicated left position in Fig. 4. This movement acts to place the bridging contactors of switch 86 in engagement with a second series of stationary contacts of reversible switch 86. As such, the positive or B+ terminal of power source 82 is connected to motor 24 through lead 118, lower closing contact 99 of reversing contactor 96, lead 116, the bridging contactor 102, lead 42, slip ring 38, electrical brush 77, the lead 106 to the armature of motor 24. Meanwhile, the negative terminal or line 84 of power source 82 is connected through upper closing contact 97 of reversing contactor 96, lead 101, upper contactor 114 of circuit closing contactor 108, lead 112, first relay bridging contactor 88, lead 109, lower contactor 107, line 41, slip ring 37, electrical brush 76, and leads 103 and 104 to the opposite terminal of motor 24. Consequently, with this circuit arrangement, the motor will be driven in a clockwise direction and since it is in drive relation with the lens iris, the latter is driven in a clockwise direction.

In the event that the iris control gear 26 and hence, the lens iris is moved to its extreme clockwise or counter-clockwise position as by an approximate 50° rotation of ring 51, abutment 66 or 67 engages its respective stop 73 on limit block 68 or 69 to open the motor circuit. This operates to deenergize motor 24 and to automatically energize an indicating light for providing an indication of this complete movement and the direction of the limit movement. The circuit and structure for providing this automatic operation will now be given. For clarity in explanation, assume that motor 24 has been driven to one of its extreme positions, as for example, to its extreme right position and that abutment 67 of gear 26 engages limit stop 73 on limit block 69. Upon engagement, stop 73, which is electrically connected to the armature of motor 24 by lead 124, is connected to ground potential indicated at 93 through the iris control gear 26, the lens assembly 14, retaining member 46, and the camera proper. This is indicated by a lead line 94 in Fig. 4.

Whenever this occurs, a circuit is completed through unlatch relay 87 as follows: From the positive or B+ terminal 83 of power source 82, power is supplied through line 119, outwardly displaced relay unlatch bridging contactor 121, line 122, winding of relay 87, line 123 to ground 93, and back to the negative potential line 84. Meanwhile, two things occur; first, line 124, which in the right position of reversing switch 86 is connected to the minus potential terminal of power source 82, is connected to ground through stop 73 of block 69, gear 26, and the structure indicated by line 94. This arrangement places the negative potential of power source 82 through line 123 on one winding terminal of relay 87. The other terminal of the relay winding is connected to conductor 122, unlatch bridging contactor 121, through lead 119 to the B+ terminal at 83. Hence, relay 87 is energized to withdraw its first relay contactor 88 away from its stationary contacts. This opens lines 112 and 109 to deenergize motor 24 for stopping the same.

Secondly, upon opening of contactor 88, bridging contactor 89 of relay 87 engages its associated contacts to energize left or right indicating lamps 91, 92; the latter depending upon whether control knob 22 and thus bridging contactor 127 is in its right or left position. The energizing circuit for lamps 91 and 92 is taken from the negative potential 84 of power supply 82, through lead 117, contactor 89, lamp 91 or 92, line 119 to the positive potential indicated at 83. It will be noted that due to the engagement of abutment 67 with stop 73, relay 87 will remain energized until reversing switch 86 is moved to its off or, conversely, its opposite directional position which is left in this instance. This serves to deenergize relay 87 and limit indicator 92, and to energize motor 24 for movement in the opposite direction. The operation of the latter is apparent from the fact that upon deenergization of relay 87, contactor 88 will rebridge its associated contacts so as to place a proper potential on the armature of motor 24.

From the above it will be apparent that there is provided a simple, compact, lens iris adjustment system which will operate to provide a fine and accurate control of the lens iris. Moreover, due to the unique circuit and structural arrangement, this control is conveniently accomplished remotely, and may be controlled independently of the focus adjustment normally incorporated in the lens assembly; the latter is apparent since the lens iris adjustment system does not affect any component of the lens assembly other than the lens iris. It will also be appreciated that with the instant control arrangement, whenever the lens iris adjustment has been moved to one of its extreme limits of travel, motor 24 is automatically stopped and an indicating light is energized to warn the operator of this condition and to indicate the direction in which the limit has been reached.

Obviously many modifications and variations of the present invention are possible in the light of the above teachings. It is therefore to be understood that within the scope of the appended claim, the invention may be practiced otherwise than as specifically described.

What is claimed and desired to be protected by Letters Patent is:

In a lens adjustment system for a barrel type camera lens, a lens unit comprising a base member adapted to be mounted upon the face of a camera, an annular support carried centrally on said base member, a metallic retainer member secured within said support, a pair of concentric slip rings secured on the upper portion of said support, a lens assembly having an adjustable iris removably secured to said retainer member, a platform mounted on said assembly having an annular sleeve resting upon a portion of said retainer member, a sector gear mounted on said iris, an adjustable frame supported on said platform, a gear box mounted on said frame, a reversible electrical motor connected to said gear box, and a worm gear connected to said gear box for driving said sector gear, a pair of stops positioned on said platform in the path of movement of said sector gear, a pair of electrical brush means mounted on said platform in engaging relation with said slip rings, electrical wire means connected between said stops, said motor and said brush means, and electrical circuit means connected to said slip rings for selectively energizing said motor, said electrical circuit means being opened when the sector gear engages a stop whereby the motor is deenergized.

References Cited in the file of this patent

UNITED STATES PATENTS

| | | |
|---|---|---|
| 2,307,479 | Annick | Jan. 5, 1943 |
| 2,406,550 | Long | Aug. 27, 1946 |
| 2,687,672 | Huebner | Aug. 31, 1954 |
| 2,694,352 | Babbs | Nov. 16, 1954 |
| 2,695,382 | Wheatley et al. | Nov. 23, 1954 |
| 2,812,484 | Westfelt | Nov. 5, 1957 |